United States Patent [19]

Peterson

[11] Patent Number: 4,564,986

[45] Date of Patent: Jan. 21, 1986

[54] APPARATUS FOR SECUREMENT OF CLINCH NUT TO CARRIER MATERIAL

[75] Inventor: Francis C. Peterson, St. Charles, Ill.

[73] Assignee: Illinois Tool Works Inc., Chicago, Ill.

[21] Appl. No.: 436,560

[22] Filed: Oct. 25, 1982

[51] Int. Cl.⁴ ............... B23P 11/00; F16B 39/282
[52] U.S. Cl. .................................. 29/33 K; 29/509; 29/522 R; 29/523; 411/179
[58] Field of Search ............... 29/509, 522 R, 523, 29/33 K, 818, 798; 411/180, 181, 183, 177, 179

[56] References Cited

U.S. PATENT DOCUMENTS

| | | | |
|---|---|---|---|
| 2,929,131 | 3/1960 | McCloskey | 29/523 X |
| 3,282,317 | 11/1966 | Zahodiakin | 411/179 |
| 3,613,431 | 10/1971 | Meyer | 29/523 X |
| 3,769,676 | 11/1973 | Feller | 29/509 X |
| 3,824,675 | 7/1974 | Ballantyne | 411/179 X |
| 3,923,089 | 12/1975 | Ladouceur | 411/179 |
| 3,969,808 | 7/1976 | Goodsmith et al. | 29/818 X |

FOREIGN PATENT DOCUMENTS 510001 10/1930 Fed. Rep. of Germany ........ 29/509

Primary Examiner—Z. R. Bilinsky
Attorney, Agent, or Firm—David I. Roche; T. W. Buckman

[57] ABSTRACT

An apparatus particularly useful for securing a deformable nut having a hole to carrier material, such as a sheet-metal panel, is disclosed. Securement of the nut to the panel is made employing essentially a one-step procedure to form a hole in the panel and to secure the nut to the panel at the panel hole. The securement procedure generates essentially no panel-material waste. Various elements of the apparatus cooperate to secure the nut to the panel. On the apparatus, a ram initially causes a nut guide to secure the panel to the apparatus, and eventually causes a piercing punch to be advanced along a path toward a receiving punch. The latter action causes the panel to be pierced. Further advancement of the ram toward a base of the apparatus causes portions of the panel adjacent the pierced portion to be urged or otherwise drawn into the nut hole, and eventually causes the nut to deform. The latter action causes the nut to be secured to the panel.

1 Claim, 13 Drawing Figures

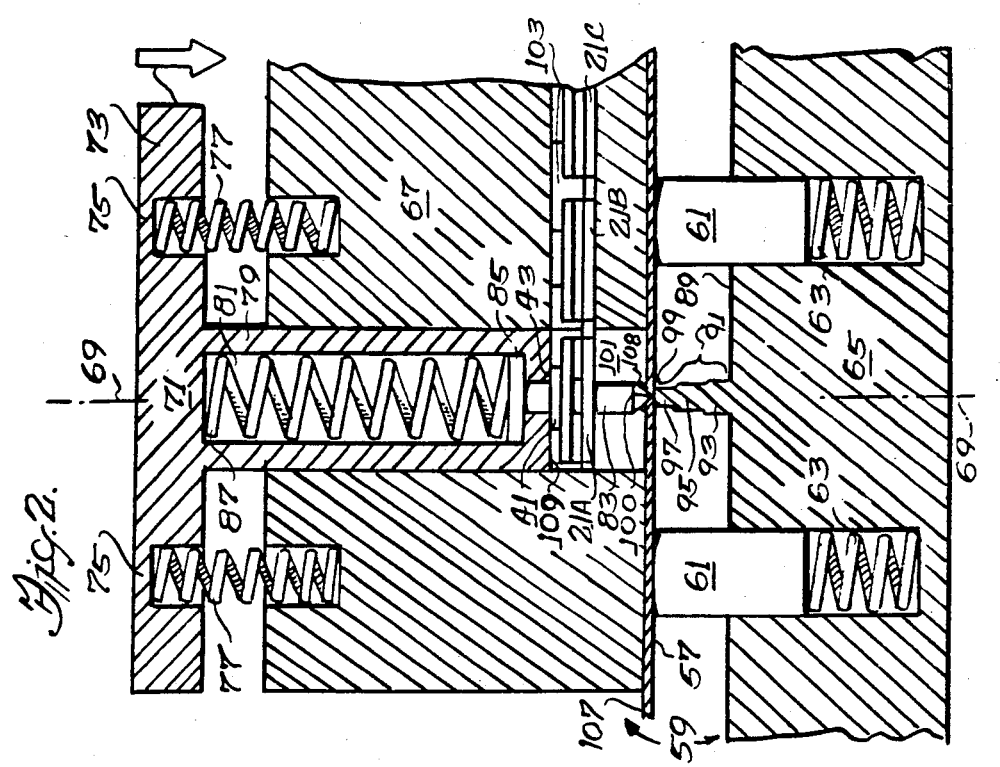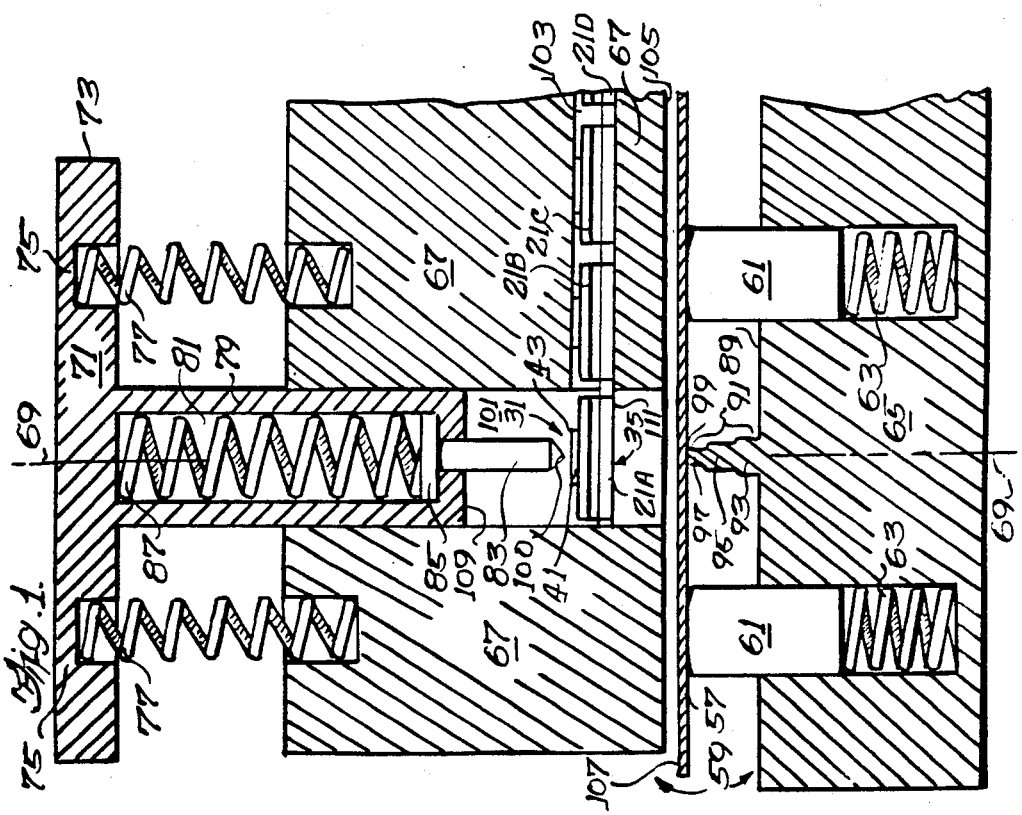

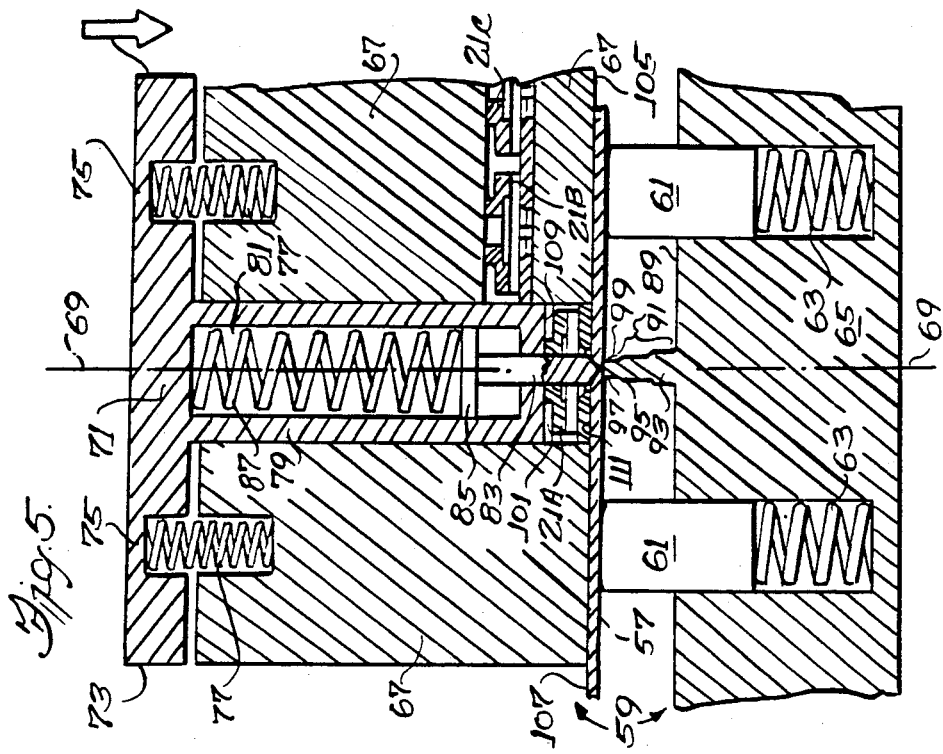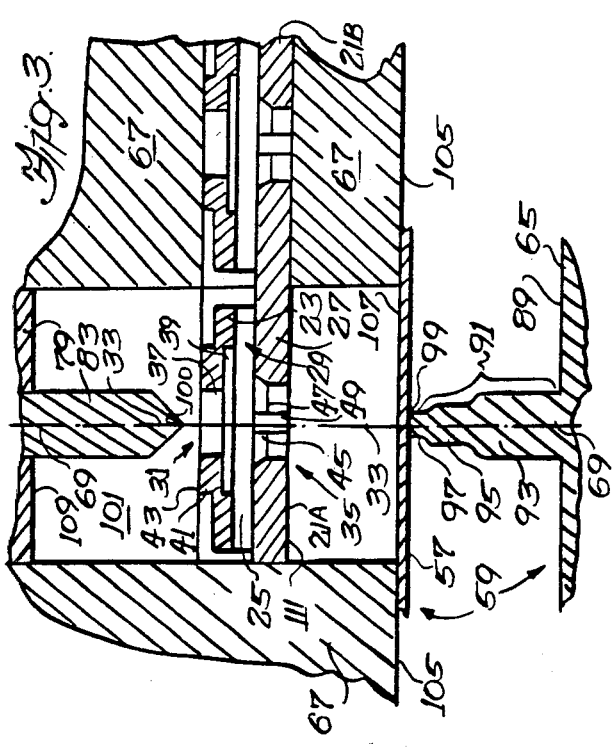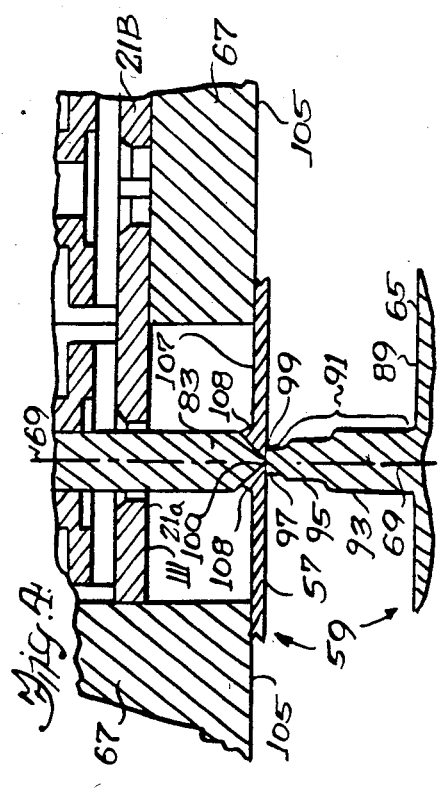

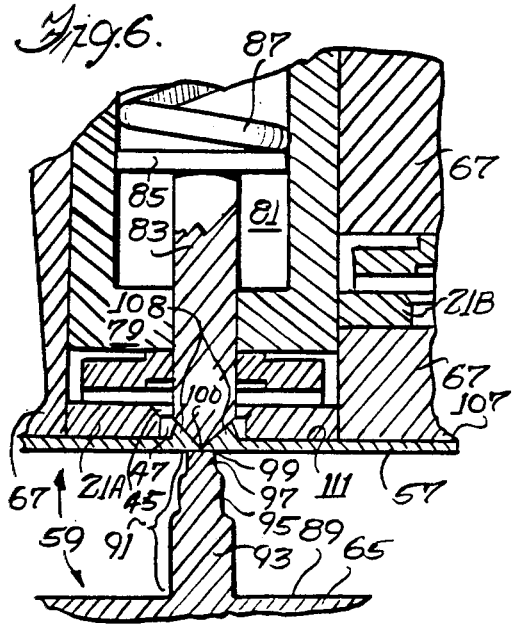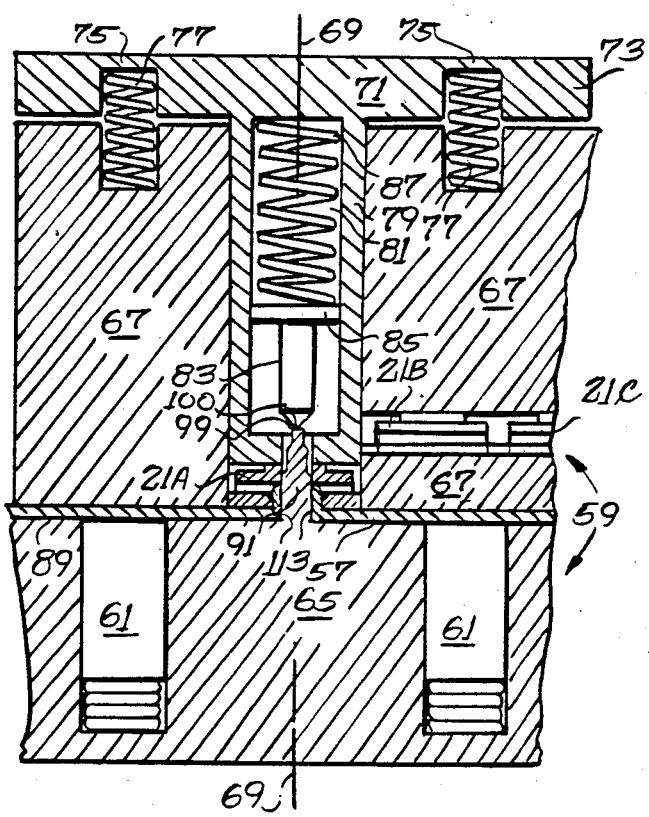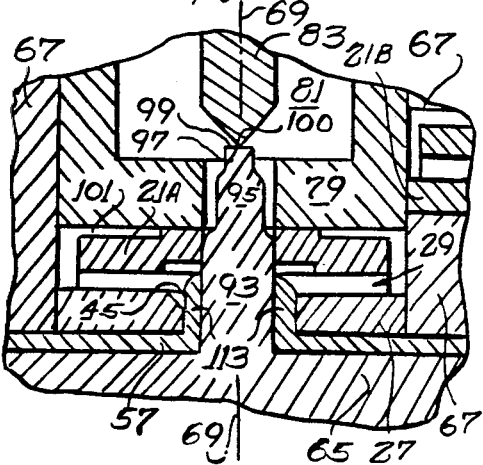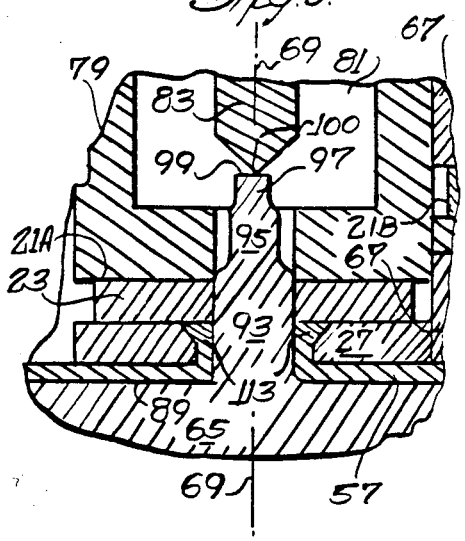

APPARATUS FOR SECUREMENT OF CLINCH NUT TO CARRIER MATERIAL

REFERENCE TO RELATED APPLICATIONS

This application, assigned to Illinois Tool Works, Inc. (ITW), of Chicago, Ill., is related to the following two patent applications entitled "Clinch Nut And Assembly Machine" and "Cut-Off For Clinch Nut Feed", respectively bearing Ser. Nos. 308,209 and 436,559. The related applications were filed respectively on Oct. 5, 1981, and Oct. 25, 1982 The former application comprises a continuation-in-part of a prior application, bearing Ser. No. 06/118,300, having been filed Feb. 4, 1980. These related applications have been assigned to ITW, and are hereby incorporated by reference.

BACKGROUND OF THE INVENTION

The present application is directed to nuts which are designed to be clinched by or otherwise secured to carrier material. In the art, such nuts are referred to as "clinch nuts". The present invention is directed to an apparatus for severing a lead nut from a plurality of attached nuts and for securing such a lead nut to carrier material. More particularly, this invention is directed to an apparatus for securing such a clinch nut to carrier material without generation of carrier-material waste.

Securement of clinch nuts to carrier material, such as a sheet-metal panel, is rarely a one-step procedure. Often, a first step is the forming of a hole in the panel, and a second step, performed at some time thereafter, is the securement of the nut to the panel at the hole.

For a variety of reasons, nuts which are to be secured to carrier material often are attached to each other in a linear fashion, which often can become quite lengthy. A lengthy arrangement of attached nuts is occasionally wound onto a spool or otherwise arranged in a coil-like manner. It is desirable to have an apparatus which incorporates, in a single action, the severing of a lead nut from an arrangement of like attached nuts and the securing of such a lead nut to carrier material. Many commercially available clinch nut-securing apparatuses either generate waste when forming the hole in the panel or do not use portions of the panel, located in the immediate vicinity of the hole formed in the panel, to secure the nut to the panel.

OBJECT AND SUMMARY OF THE INVENTION

Accordingly, it is a general object of this invention to provide an apparatus able to sever a clinch nut from an arrangement of attached clinch nuts and to secure such a clinch nut to carrier material while generating essentially no carrier-material waste.

Briefly, and in accordance with the foregoing object, the novel apparatus of the present invention will now be summarized. The apparatus includes a ram, a piercing punch, a receiving punch, a nut guide, two strippers and a fixed base. Each stripper is biasly disposed within a respective cavity formed in the base. The nut guide is advanceable and retractable (in relation to the base) by the ram along a path. The ram includes a head portion, which is biased away from the nut guide, and a housing portion into which the upper or piercing punch is biasly disposed.

The lower or receiving punch extends upwardly from an upper surface of the base with which it is integral. The receiving punch is oriented along the path in the direction of the piercing punch. The lower or receiving punch has an upper surface which, together with the two strippers, initially supports carrier material, such as a portion of sheet-metal panel, upon the apparatus. The nut guide is initially supported between the ram and carrier material.

The nut guide includes two interconnecting passageways. The housing portion of the ram fits snugly into the first passageway, and a linear arrangement of attached clinch nuts is advanceable through the second passageway. The first or lead nut of such a linear arrangement of attached nuts is advanceable through the second passageway into the first passageway.

Cooperation of the various elements of the apparatus of the present invention to sever a lead nut from an arrangement of like attached nuts and to attach such a lead nut to carrier material, employing essentially a one-step procedure, while generating essentially no carrier-material waste, will be discussed below.

BRIEF DESCRIPTION OF THE DRAWINGS

The foregoing, as well as other objects, features and advantages of the present invention, will become more readily understood upon reading the following detailed description of the illustrated embodiments, together with reference to the drawings, wherein:

FIG. 1 is a side view, partially in section, of one embodiment of an apparatus in accordance with the present invention, the view presenting relative arrangement of various elements or components of the apparatus (in a starting position);

FIG. 2 is a view similar to FIG. 1 showing a later sequence of the elements of the apparatus;

FIG. 3 is a side view on an enlarged scale of some of the elements presented in FIG. 1;

FIG. 4 is a view similar to FIG. 3 showing contact of the piercing punch tip with the receiving punch upper surface;

FIG. 5 is a view similar to FIG. 2 showing that downward advancement of the housing (toward the base), relative to the nut guide, severs the lead nut from the remainder of the arrangement of attached nuts;

FIG. 6 is a side view on an enlarged scale of some of the elements or components presented in FIG. 5;

FIG. 7 is a view similar to FIG. 5 showing that downward advancement toward the base by the ram causes the nut guide to move downwardly towards the base thereby urging the severed nut downwardly through the first nut guide passageway, the piercing punch being urged out of the hole of the severed nut by the entering receiving punch head which causes portions of carrier material to be drawn into the nut hole;

FIG. 8 is a side view on an enlarged scale of some of the elements presented in FIG. 7;

FIG. 9 is a side view similar to FIG. 8 showing further advancement of the housing toward the base causing partial collapse or deformation of certain portions of the nut thereby securing the nut to the carrier material;

DETAILED DESCRIPTION OF THE ILLUSTRATED EMBODIMENTS

Figure 13:
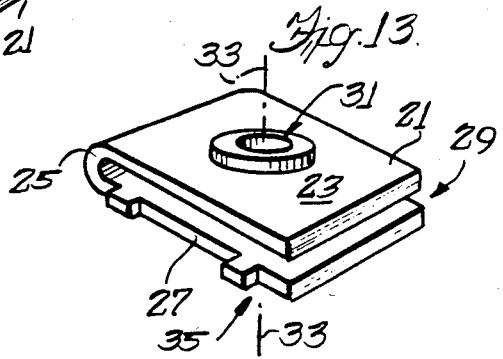
FIG. 13 presents, in perspective, an individual clinch nut.

Referring to the drawings, and initially to FIG. 3, a lead nut 21A of a linear arrangement of attached like nuts 21A–21D (FIG. 1), preferably used in the apparatus of the present invention, will now be discussed. An individual nut is generally referred to by the reference numeral 21 throughout this application (FIG. 13). Attached nuts are generally additionally referred to by a capital letter which designates linear order within the attached arrangement (e.g., nuts 21A–21C, FIGS. 1, 2, 5 and 7).

The lead nut 21A, when viewed on edge, is a one-piece, deformable U-shaped re-entrant comprising a first or upper leg 23 which is integral through a base portion or bight 25 with a second or lower leg 27. This results in the nut 21A having a gap or void 29 between the legs 23, 27. Extending from the bight 25, the legs 23, 27 are essentially in parallel relation. A first or upper substantially circular hole 31, through the upper leg 23, is axially concentric, along the axis 33, with a second or lower substantially circular hole 35 through the lower leg 27. The upper hole 31 includes two axially concentric cylindrical steps 37, 39. The diameter of the second step 39, which is the step closer to the gap 29. is substantially greater than the diameter of the first step 37. An annular surface projection or shoulder 41 extends radially outwardly from the axis 33 from an upper portion of the nut 21A immediately adjacent the upper periphery of the first step 37. The annular shoulder 41 has an external diameter dimension which is substantially the same as the diameter dimension of the second step 39 of the upper hole 31. An annular lip 43 on the upper surface of the shoulder 41 extends or projects axially and upwardly from the remainder of the upper surface of the upper leg 23 by a height dimension which is approximately the same as the axially directed depth dimension of the second step 39 of the upper hole 31.

The second or lower hole 35 also includes two axially concentric steps 45, 47. The first step 45 of the lower leg 27 which is closer to the gap 29 is essentially a truncated conical section. Moving axially within the first step 45 (of the lower leg 27) along the axis 33 and away from the gap 29, the diameter of the first step 45 decreases uniformly and eventually blends into the diameter of the second step 47 which is essentially cylindrical about the axis 33.

A plurality of arcuately spaced surface projections or "teeth" 49 projects radially inwardly (toward the axis 33) from the periphery of the first and second steps 45, 47 of the lower hole 35. The teeth 49 preferably extend axially along the entire inner periphery of the first and second steps 45, 47 (of the lower hole 35). There are preferably four such teeth 49, which are circumferentially approximately equally spaced about the inner periphery of the first and second steps 45, 47. However, only one such tooth 49 is presented in FIG. 3 for the purpose of clearly presenting the lower hole 35 of the preferred nut 21A.

The arcuate dimension or arched width of any one tooth 49 is preferably substantially the same as the arched width of any other tooth 49. The arcuate width and the axial depth dimensions of an interstice or gap between any two adjacent teeth 49 are approximately equal to respective width and depth dimensions of any other such interstice or gap. The circumferentially directed width dimension of any such interstice is preferably more than the circumferentially directed width dimension of any tooth 49.

The first and second steps 37, 39 of the upper hole 31 preferably have respectively the smallest and largest diameters of all heretofore mentioned steps 37, 39, 45 and 47 of both holes 31, 35. (Surface projections or teeth 49 are included and have been considered for the purpose of reducing the effective diameter dimensions of the steps 45, 47 of the lower hole 35.)

Figure 10:
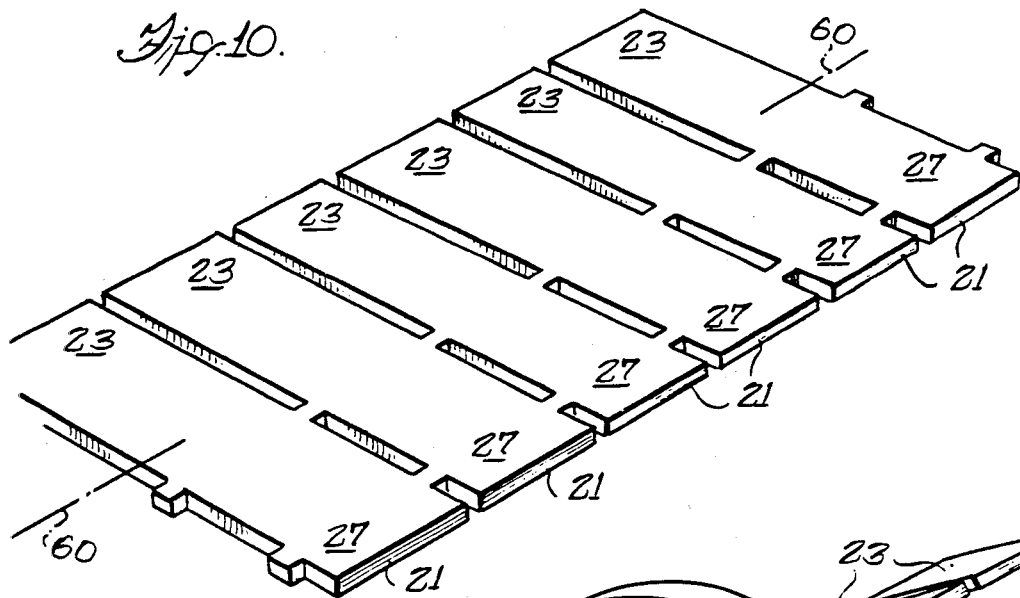
FIG. 10 presents a top view, in perspective, of a linear arrangement of attached clinch nuts (on an enlarged scale) prior to bending.
Figure 11:
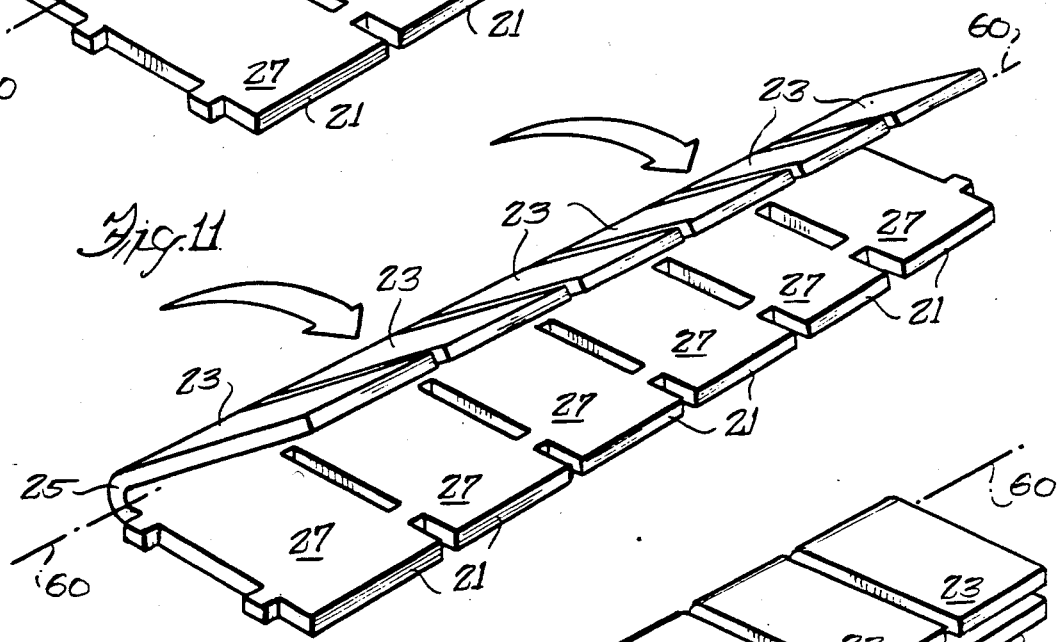
FIG. 11 presents the linear arrangement of FIG. 10 during bending.
Figure 12:
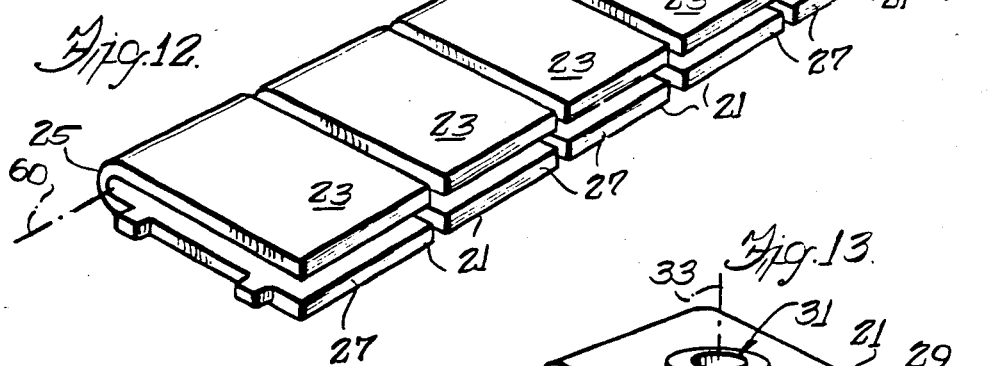
FIG. 12 presents the linear arrangement of FIG. 10 after bending.

FIGS. 10–12 present formation of the clinch nut 21, preferably usable with the apparatus 59 of the present invention. A sheet of metal of appropriate thickness is slotted and oriented about a bend line 60 (FIG. 10).

Before holes are formed in the individual nuts 21, the legs 23 and 27 are formed, the nuts 21 straddling the bend line 60 (FIG. 11), and a linear arrangement of attached nuts 21 is eventually formed (FIG. 12). The nuts 21 can then individually have the upper and lower holes 31, 35 respectively formed through the upper and lower legs 23, 27 (FIG. 13), as above described or otherwise as desired. Or, desired holes could be formed prior to bending.

The nuts 21 are deformable and non-rotatably securable to carrier material (such as a sheet-metal panel 57), by the apparatus 59 of the present invention, which will now be described.

Referring to FIG. 1, it will be seen that the apparatus 59 includes two strippers 61 which are individually biased, in a known manner, by springs 63 away from a fixed base 65. The apparatus 59 also includes a nut guide 67 which is advanceable and retractable along a path 69 by a ram 71. Advancement or retraction of the nut guide 67 along the path 69 is in relation to the fixed base 65.

The ram 71 includes a head portion 73 which is preferably biased at two positions 75, in a known manner, by springs 77, away from the nut guide 67. The two positions 75 are preferably equally spaced from and on opposite sides of the path 69. The ram 71 also includes a housing portion 79 providing a substantially cylindrical cavity 81 in which is biasly disposed an upper or piercing punch 83.

Within the housing 79, the substantially cylindrical piercing punch 83 has an integral head 85 which is located at one end of the cavity 81 and is biased, in a known manner, by a spring 87 bearing against the other end of the cavity 81.

When the apparatus 59 is in a "starting position" (FIG. 1), much of the piercing punch 83 extends outwardly through and downwardly from the housing 79, and is oriented along the path 69.

A lower or receiving punch 91 extends outwardly or upwardly from an upper surface 89 of the base 65. The receiving punch 91 is preferably substantially cylindrical and preferably includes three integral steps 93, 95 and 97 axially concentric along the path 69.

The third step 93 has the largest diameter of the three steps 93, 95 and 97, and is integral with the upper surface 89 of the base 65. The second step 95 is intermediate the third and first steps 93, 97. The first step 97 has an upper surface 99 which, together with the two strippers 61, supports the panel 57 upon the base 65. The upper surface 99 also engages and receives a tip portion 100 of the piercing punch 83 (FIGS. 1–4, 6, 8, 9). To maintain integrity and sharpness of the tip portion 100, the tip portion 100 and the piercing punch 83 are preferably harder than the upper surface 99 of the receiving punch 91.

In the starting position, the nut guide 67 is supported in a known manner (as shown), above the panel 57. It can be appreciated that such support can be a mechanical element, such as a cantilevered moment arm, which is forced downwardly toward the base 65 by an hydraulically-actuated, electrically-actuated or other like device, or that such support can be otherwise, as desired.

Referring generally to FIGS. 1, 2, it will be seen that the nut guide 67 includes two interconnecting passageways 101, 103. The housing 79 preferably fits snugly axially within the first passageway 101 and is therein advanceable and retractable along the path 69. A linear arrangement of the nuts 21A-21C is advanceable through the second passageway 103. It can be appreciated that the nuts 21A-21C can be advanced using known devices. Such advancement can be effected by a mechanical, hydraulic or electrical device or in some other manner, as desired. The second passageway 103 is preferably oriented substantially transversely to the path 69, and the first or lead nut 21A of the linear arrangement of attached nuts 21A-21C is additionally advanceable through the second passageway 103 and into the first passageway 101 intermediate the piercing punch tip 100 and an upper surface 107 of the panel 57. (See FIG. 1 only.)

As the lead nut 21A is advanced into the first passageway 101, the upper and lower holes 31, 35 (of the nut 21A) are axially oriented along the path 69 so as to permit the piercing punch 83 to be freely advanceable therethrough.

The diameter dimension of the piercing punch 83 is preferably slightly less than the diameter dimension of the first or upper step 37 of the upper leg 23 of the nut 21A (see FIGS. 3, 4).

The piercing punch 83, the housing 79 and the nut guide 67 are advanceable and retractable by the ram 71 along the path 69 in relation to the base 65.

Cooperation of the various elements of the apparatus 59 to sever the lead nut 21A from the linear arrangement of attached nuts 21A-21D and to attach such a nut 21A to the panel 57, employing essentially a one-step procedure, while generating substantially no panel-material waste, will now be discussed.

From the starting position (FIG. 1), the ram 71 initially advances the piercing punch 83 and the housing 79, as a unit, along the path 69 and toward the receiving punch 91. (Compare FIGS. 1, 2.) It can be appreciated that the ram 71 can be operated hydraulically, mechanically, electrically or otherwise to advance the housing 79, piercing punch 83, and the nut guide 67 toward the base 65. Such advancement of the ram 71 initially causes a lower surface 105 of the nut guide 67 to engage the upper surface 107 of the panel 57 (FIG. 3). Further advancement of the ram 71 toward the base 65 advances the piercing punch 83 and the housing 79, as a unit, along the path 69 toward the receiving punch 91, compressing the upper springs 77. The lower springs 63 of the base 65 are substantially stiffer than the upper springs 77, 87. Eventually, the tip 100 of the piercing punch 83, advanced along the path 69 and through the holes 31, 35 of the lead nut 21A, pierces the panel 57 (causing portions 108 of the panel 57 to elastically deform upwardly or otherwise separate, see FIGS. 2, 4) and engages the upper surface 99 of the receiving punch 91 as a lower portion 109 of the housing 79 engages the lip 43 on the shoulder 41 of the upper leg 23 of the nut 21A.

Further advancement of the housing 79 towards the base 65 by the ram 71 causes the housing 79 to move along the path 69, relative to the nut guide 67 (and the piercing punch 83), thereby compressing the upper spring 87 and severing the lead nut 21A from the remainder of the arrangement of attached nuts 21B-21C. Still further advancement of the housing 79 towards the base 65 along the path 69 by the ram 71 causes a lower surface 111 of the lower leg 27 of the lead nut 21A to engage the upper surface 107 of the panel 57 (FIGS. 1, 5, 6).

Yet further advancement of the nut 21A toward the base 65, by the action of the ram 71, causes the nut guide 67 to advance the panel 57 along the path 69 toward the base 65 thereby compressing the lower springs 63 and also causing the severed nut 21A to be urged downwardly in relation to the fixed receiving punch 91 (FIG. 7). Such advancement causes the nut 21A to be urged off of the piercing punch 83 and onto the receiving punch 91. The receiving punch 91 and particularly the first, second and third steps 97, 95 and 93 thereof cooperate to cause portions 113 (FIG. 8) of the panel 57, which had been proximate to the pierced and otherwise deformed portions 108 of the panel 57 mentioned above (FIGS. 2, 4, 6), to be drawn or otherwise urged into the first and second steps 45, 47 of the lower leg 27 and partially into the gap 29 of the nut 21A with substantially no generation of panel-material waste. Furthermore, the portions 113 are also caused to be drawn or otherwise urged against the teeth 49 and between the teeth 49, which causes the nut 21A to be non-rotatably secured to the panel 57.

Yet further advancement of the housing 79 along the path 69 toward the base 65 by the ram 71 causes the shoulder portion 41 of the upper leg 23 of the nut 21A to elastically or otherwise deform thereby causing the shoulder 41 to deform into the upper leg 23 and the upper and lower legs 23, 27 to be urged together substantially eliminating the gap 29 and thereby positively fastening and clinching portions 113 of the panel 57, which were drawn into the gap 29, to the nut 21A (FIG. 9).

Thereafter, the piercing punch 83 and housing 79 are upwardly retractable from the holes 31, 35 of the clinched nut 21A by the ram 71 along the path 69, back to the starting position (FIG. 1). The springs 63 expand urging the strippers 61 upwardly thereby removing the clinched nut 21A from the receiving punch 91. Once the ram 71 has retracted to the starting position, the panel 57 with nut 21A clinched thereto, can either be advanced along or entirely removed from the strippers 61, as desired. The remainder of attached nuts 21B-21D can be advanced, if desired, within the second passageway 103 thereby causing a second lead nut 21B to be extended into the first passageway 101. If desired, the entire above-described procedure can be repeated.

What has been illustrated and described herein is a novel apparatus for securing a nut to carrier material. While the nut and apparatus have been illustrated and described with reference to preferred embodiments, the present invention is not limited thereto. On the contrary, alternatives, changes or modifications may become apparent to those skilled in the art upon reading the foregoing description. Accordingly, such alternatives, changes or modifications are to be considered as forming a part of the invention insofar as they fall within the spirit and scope of the appended claims.

I claim:

1. An apparatus for securing a nut to carrier material comprising: a first punch, a housing for retractably carrying said first punch outwardly from one end of said housing, a nut guide with a pair of intersecting passageways for receiving nuts, said housing being slideably disposed within one of said passageways, a second punch, and a base carrying said second punch, second spring means for urging said nut guide toward said carrier material, and spring loaded carrier support means holding said carrier material in an initial position adjacent said second punch.

* * * * *